United States Patent Office 3,545,204
Patented Dec. 8, 1970

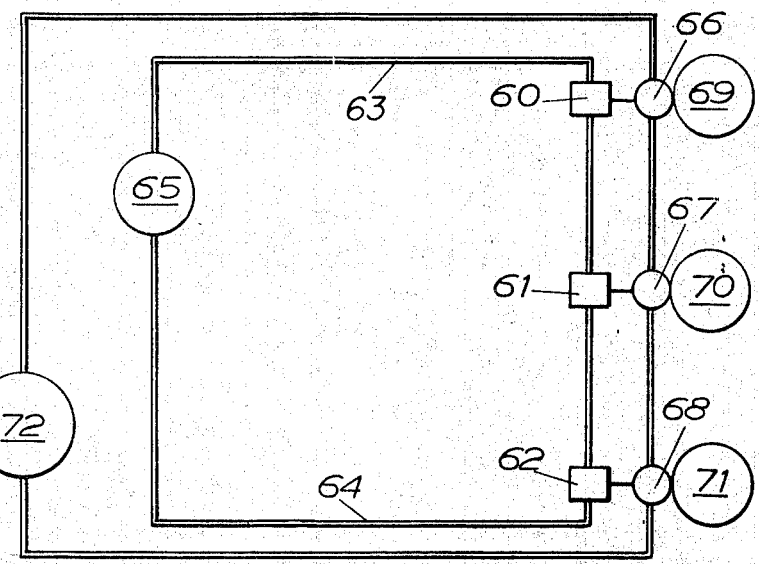
—FIG. 7.—
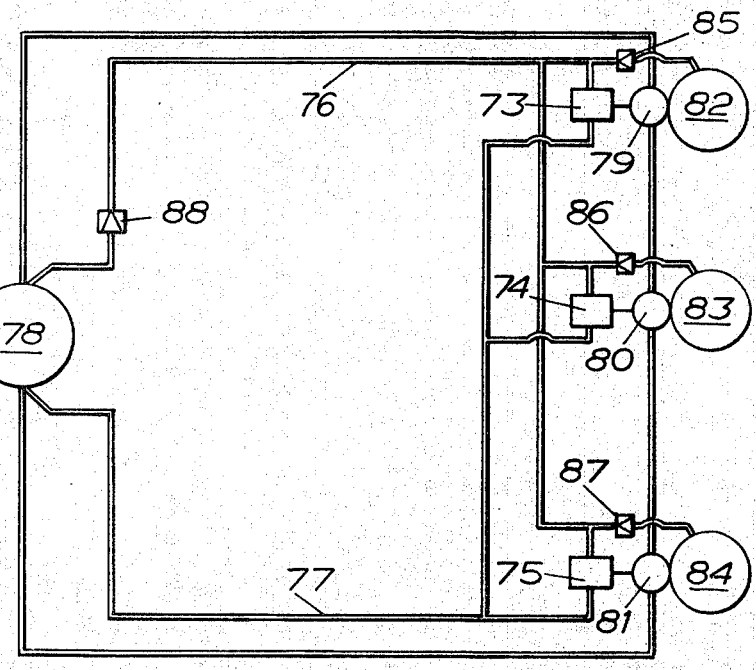
—FIG. 8.—

3,545,204
ARRANGEMENTS IN THE CONTROL SYSTEM OF HYDROSTATIC WINCHES OF THE LOW PRESSURE TYPE
Leiv Roaldsnes, Brattvag, Norway, assignor to A/S Hydraulik Brattvaag, Brattvag, Norway
Filed Nov. 27, 1968, Ser. No. 779,528
Claims priority, application Norway, Nov. 29, 1967, 170,738
Int. Cl. F15b 11/08; F16d 31/06
U.S. Cl. 60—53
16 Claims

ABSTRACT OF THE DISCLOSURE

A hydraulic control system wherein an operating handle axially displaces an auxiliary slide arranged in a piston from a neutral position, the slide and the piston being provided with cooperating grooves and passages for the flow of a driving medium respectively to and from the sides of the piston corresponding to the original displacement, thus effecting the displacement of the piston and an operatively connected main valve slide, the auxiliary slide being forced back into neutral position by a double-operating spring. A housing for the piston has radial openings for the inlet and outlet of the driving medium.

---

The present invention relates to control systems for hydraulic winches of the low pressure type. In such winches there is a pump which delivers a constant volume of driving medium per unit time to a motor having a generally constant consumption of driving medium per revolution via a control valve of the four-way type, usually referred to as the operating valve, which is adapted in addition to adjust the driving direction of the motor, to vary its speed by directing a suitable quantity of driving medium outside the motor through a short circuit path directly to the return conduit of the pump.

When the motor generally has a constant consumption of driving medium per revolution, and several motors or motor cylinders are present which are fed in parallel with driving medium, it is desirable that one or more motors or motor cylinders be withdrawn from operation (for example with pressure-controlled valves), so that all the driving medium be fed to the remaining motors or motor cylinders. These types of motors are used in especially large winch installations, for which the present invention is especially advantageous, such as anchor winches, mooring winches and large loading winches.

The hydraulic system in such winches operates at relatively low pressures, up to about 35–40 kp./cm.². In spite of this low pressure these types of hydraulic winches are preferred for many reasons, both by virtue of price and by virtue of their robustness and reliability. Also these low pressure winches have several other advantages over high pressure hydraulics.

The said operating valve consists of an axially displacable slide received in a bore in a valve housing. The slide is obviously counterbalanced for pressure, while the space at each end is always supplied with either driving medium or return medium.

One of the few disadvantages of these low pressure winches is the need for a large cross-sectional flow, especially when the winches are to have a high hoisting ability, something which is especially required on board ship, for example in anchor winches and hauling winches. Also the loading winches must have a loading ability of several tons. This means that the operating valves, in spite of their hydraulic counterbalancing, require considerable power in order to be adjusted to their various positions. In conventional ship's winches 10–12 kp. is required in order to move the winch pull handle to the positions for hoisting and lowering respectively. Two contributory reasons for this are firstly that there is a demand for a reverse mechanism which moves the pull handle and with it the valve back to the stop position when the pull handle is released, and secondly that one must work with all parts in the system and not the least in the operating valve with as narrow fits and low tolerances as is in general possible, in order to keep leakages and from these ensuing pressure, and energy losses, as low as possible.

Another problem in connection with the control of such hydraulic winches is that the operator must always have full control over which the position to which the valve must be adjusted, and hence the adjustment of the motor. This applies the higher the load, since it is precisely with high loads that there is the special need to be able to adjust for pliable and uniform hoisting without jerking and for lowering with the lowest "creeping speed," so that the load is set gently and free of jarring down on the ground. This problem is especially present in hydraulic low pressure winches, because hoisting and lowering here commences momentarily without the pressure having to build up, such as for example with compressed air motors and steam winches.

It is the main object of the present invention to provide a control system for hydraulic winches of the low pressure type without the above disadvantages and which is durable in construction and reliable in operation.

It is another object of the present invention to provide a control system for hydrostatic winches of the low pressure type in which the power which is required for adjustment can be as low as ½–1 kp.

It is a further object of the present invention to provide a control system for hydrostatic winches in which the adjustment of the operating pull handle agrees well with the adjustment of the operating valve slide.

Accordingly the present invention consists in a control system for hydraulic winches wherein an operating pull handle is adapted to displace an auxiliary slide from a zero position in which this slide and a part cooperating with said auxiliary slide are hydraulically counterbalanced to pressure, to a position in which said part cooperating with said auxiliary slide is exposed to hydraulic counterbalancing in the same direction in which displacement has taken place.

The said part cooperating with the auxiliary valve can be formed by the slide of the operating valve. It is preferred however that the part is a separate part, which via a suitable transmission is connected to the slide of the operating valve. This transmission can be mechanical or hydraulic. Especially when the transmission is mechanical, the said reverse mechanism known per se which reverses the operating valve to the stop position when the operating pull handle is released, can be built into the auxiliary slide. Because the auxiliary slide only controls relatively low quantities of fluid, its dimensions can be substantially less than that of the operating valve, and the power from the reverse springs which are used, can be substantially much lower than when such springs are to operate directly on the main slide of the operating valve.

Further features and advantages of the invention will be evident from the following description of individual examples of preferred embodiments illustrated in the accompanying drawings, in which:

FIG. 1 diagrammatically shows a hydraulic control system according to the invention.

FIG. 7 shows schematically how several auxiliary controls can be coupled in series in the case when they are supplied from a separate auxiliary pump.

FIG. 8 shows schematically how several auxiliary controls can be coupled in parallel in the case when they are supplied from the installation's main pump.

Figure 1:
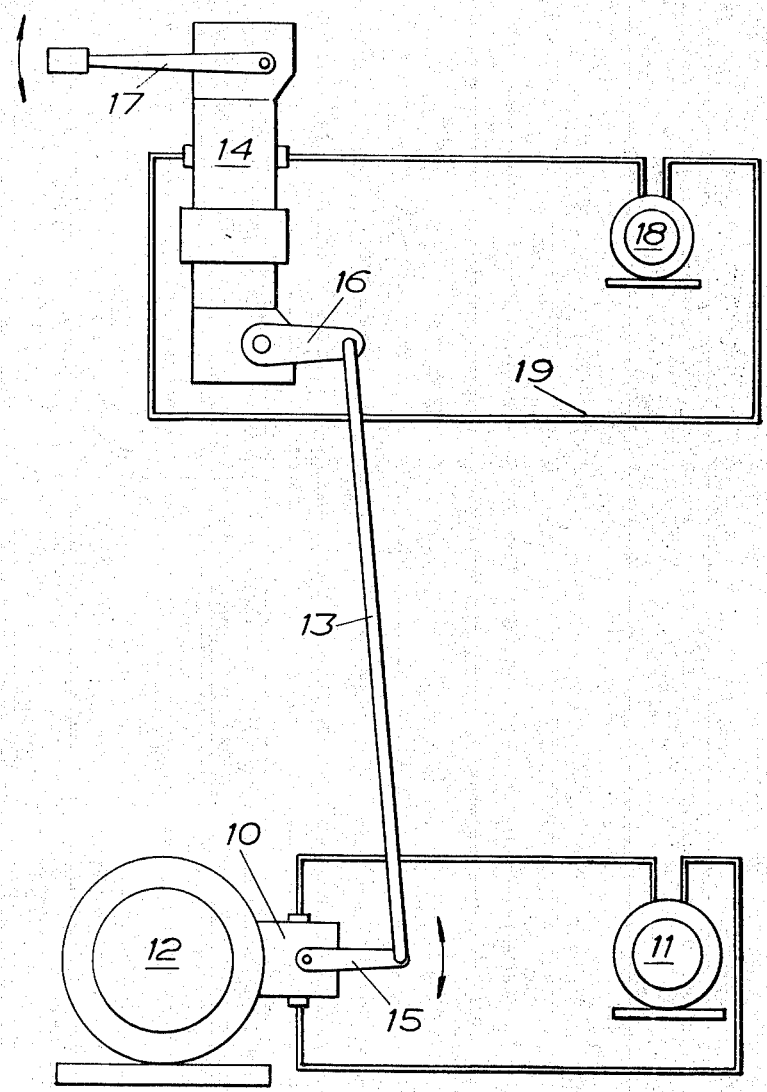

In FIG. 1 there is illustrated an operating valve 10 inserted in a short hydraulic circuit where in addition a hydraulic pump 11, a hydraulic motor 12 and other details (not illustrated) such as reverse valves, safety valves and the like are located. To the operating valve via an arm 13 there is connected an auxiliary control 14, the arm 13 connecting the control means 15 of the operating valve 10 to the working means 16 of the auxiliary control 14. The working means is also able to be connected directly to the control means of the operating valve. The auxiliary control is controlled by an operating pull handle 17 and is supplied with oil from a separate auxiliary pump 18 through a short hydraulic circuit 19.

Figure 2:
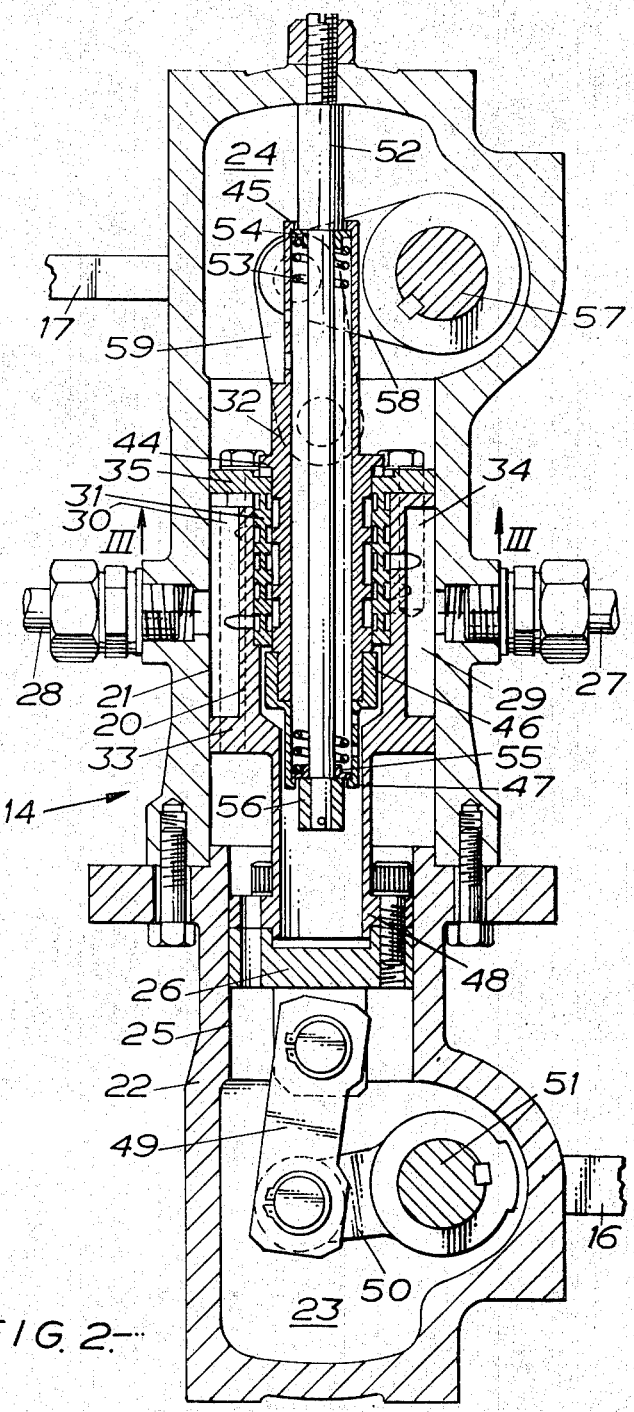
FIG. 2 shows in section an auxiliary control for a hydraulic control system.

In FIG. 2 the construction of an auxiliary control is illustrated in a preferred embodiment. It comprises a cylindrical piston 20 which is positively connected to the working means 16 in a manner which will be described in the following description, and is displaceably arranged in a cylinder 21 in a cylinder housing 22. The cylinder housing 22 is shown here with the longitudinal axis vertical, but it can just as well be mounted with the latter horizontal. In the cylinder housing 22 are a first chamber 23 and a second chamber 24 which form respective ends of the cylinder 22. Between the cylinder 21 and the first chamber 23 there is inserted a cylinder portion 25 of smaller diameter than the first cylinder 21 and which receives a control piston 26. This control piston 26, which will be described further in the following description, is rigidly connected to the piston 20. The cylinder housing is divided, for production reasons, into two parts at the transition between the main cylinder 21 and the control cylinder 25, and the two parts are joined together by means of a screw connection.

Approximately in the center of the main cylinder 21 there are arranged two opposed openings 27, 28 substantially radially through the cylinder housing 22 for pressure oil feed and return oil discharge respectively. In the piston 20 there is arranged outside each of these openings a longitudinal cavity 29, 30 which uncovers the respective openings 27, 28 during the whole movement of the piston, the piston 20 being prevented from turning.

In the piston 20 there is arranged a bore in which a pipe-shaped control slide housing 31 having a control slide 32 is arranged. The piston 20 is provided in addition with a bore 33, 34 inwards from each of the ends of the piston 20. The bore 33 empties out into that portion of the cylinder 21 which is joined to the first chamber 23 and the bore 34 empties out into that portion of the cylinder which is connected to the second chamber 24.

The control slide housing 31 is maintained in position in the piston 20 by a plate 35 having the same external diameter as the piston and which is secured at its end face adjoining the other chamber 24 by means of screws. The bore 34 in the piston is led below through the plate 35. The plate 35 is provided with a circular bore which together with the control slide housing 31 serves as a guide for the control slide 32.

Figure 3:
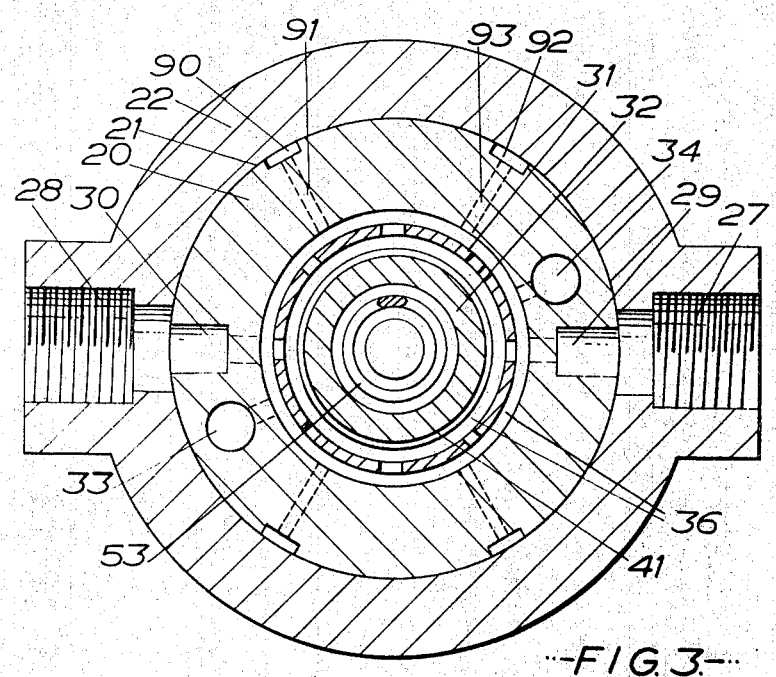
FIG. 3 shows a section on the line III—III of FIG. 2.
Figure 4:
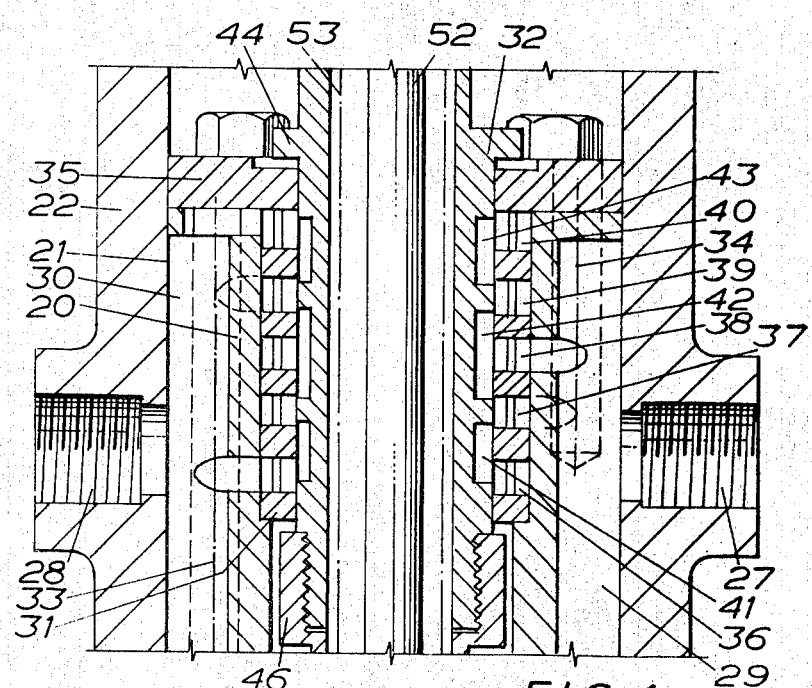
FIG. 4 shows in section the piston with the control slide in a neutral position having complete passage.
Figure 5:
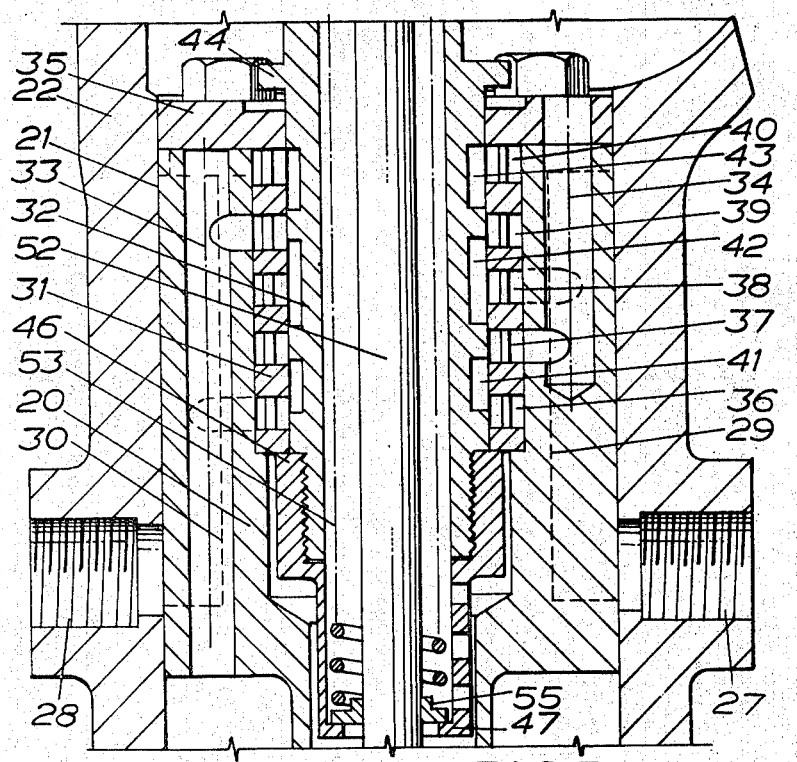
FIG. 5 shows in section the piston with the control slide in working position I.

As shown in FIGS. 3-5 the control slide housing 31 has five pairs of internal and external annular grooves 36-40 which are each connected with bores and which are disposed in series one after another with an equally large mutual spacing. The piston 20 is further provided with passages so that the groove 36 communicates with the cavity 30 which uncovers the discharge opening 28, the groove 37 communicates with the bore 34 which opens out into the chamber 24, the groove 38 communicates with the cavity 29 which uncovers the supply opening 27, the groove 39 communicates with the bore 33 which empties out into the chamber 23, and the groove 40 communicates with the cavity 30 which uncovers the discharge opening 28. The cavity 30 is thus connected to two grooves 36 and 40.

The control slide 32 is designed as a substantially pipe-shaped member having a uniform internal diameter and a graded external diameter composed of the following portions: a main portion arranged centrally in the control slide housing 31 which carries three external annular grooves 41, 42 and 43 for cooperation with its grooves 36-40, an internally disposed portion possessing external threads of small diameter, an outwardly disposed outwardly directed flange 44 which limits the movement of the central slide 32 in a direction inwards towards the piston 20, and a graded, outwardly projecting portion which is terminated by an inwardly directed flange 45, the flange 44 lying between the groove-carrying portion and the outwardly projecting, flange-carrying portion. The outwardly projecting portion is provided in addition with radial bores and a reinforcement for connection with an operating arrangement which will be described later.

On the threaded portion of the control slide 32 there is mounted a cap-shaped sleeve 46 having a graded external diameter and the same internal diameter as the control slide. The outwardly projecting graded end of the sleeve 46 is provided with an internally directed flange 47 similar to the flange 45, and having radial bores. The sleeve 46 has a portion with largest external diameter which is slightly larger than the bore of the control slide housing so as to limit the movement of the control slide 32 in a direction outwards from the piston 20.

As shown in FIG. 3, the piston 20 has, in addition to the cavities 29 and 30, four further axially arranged cavities or grooves, of which one pair of cavities 90 is arranged symmetrically to the cavity 29, i.e., spaced 120° on either side thereof, and another pair of cavities 92 is arranged symmetrically to the cavity 30 in the same manner. The piston 20 will thus have six axially extending cavities arranged in a mutually angular spacing of 60°, the cavities being substantially of the same width and the same length.

While the cavities 29 and 30 have a substantial depth to pass pressure oil to and from the various grooves, the cavities 90 an 92 are shallow as shown in FIG. 3. The pair of cavities 90 is connected to the annular groove 38 through bores 91 while the pair of cavities 92 is connected to the annular groove 36 or 40 through bores 93. The bores 91 and 93 are arranged radially from the bottom of the corresponding cavities 90 and 92 respectively. The diameter of the bores is preferably substantially smaller than the width of the cavities.

Each of the cavities 29 and 30 will thus communicate with a pair of cavities, 90 and 92 respectively, each communicating group of cavities being arranged in a symmetrical manner as seen in FIG. 3. The pressure prevailing in each of the cavities 29 and 30 will therefore also prevail in the pair of cavities 90 and 92, respectively. As the surfaces of the cavities facing the main cylinder 21 are equal, the resultant of the forces acting from each group of cavities against the cylinder housing 22 is substantially zero. In this manner a radial balancing of the piston 20, which will facilitate the movement of the piston, is achieved.

For the reception of the outwardly projecting end of the sleeve 46 the piston 20 is formed with a pipe-shaped rod 48 coaxially of the control slide housing 31. The rod 48 transfers the working force of the piston 20 to the control piston 26 and is secured to the latter by means of a pressure-tight screw connection. The control piston 26 is link-connected to a link arm 49 which in turn is link-connected to an arm 50 which is carried by a shaft 51 mounted in the wall of the cylinder housing 22. This shaft 51 has mounted thereon an external arm 16 which in the present case constitutes the working means of the auxiliary control.

The control piston 26 is provided with axial openings which establish a connection for oil to and from the chamber 23. The connection for oil from the chamber 24 to and from the piston 20 and the internal space of the control slide 32 is established through the said radial opening in the outwardly projecting portion of the control slide 32 and the end of the sleeve 46.

To support the control slide there is arranged in the end of the cylinder housing 22 by the chamber 24 a bolt 52 which carries a screw spring 53 fixed between an abutment 54 which bears against a step on the bolt 52 and an abutment 55 which bears against a stop 56 fixed on the end of the bolt 52. Both abutments 54 and 55 can be displaced on the step portion of the bolt 52 which together with the spring 53 are arranged in the bore of the control slide 32 so that its flange 45 bears internally against the abutment 54 while the flange 47 bears internally against the abutment 55.

In the wall of the chamber 24 there is mounted a shaft 57 which carries externally the operating pull handle 17 and an arm 58 which is link-connected via a link arm 59 to the control slide 32, in a similar manner as the arm 50 is link-connected to the control piston 26.

MODE OF OPERATION

Figure 6:
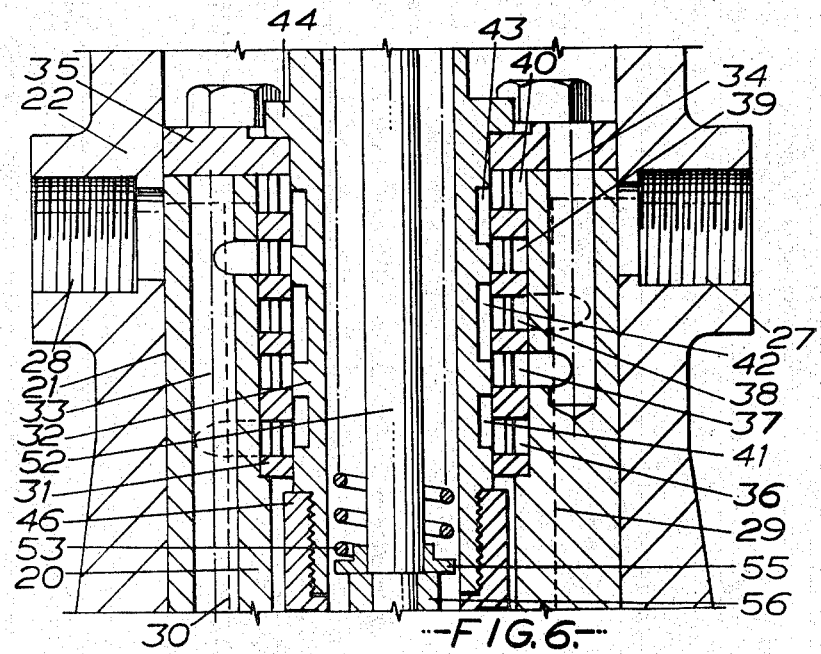
FIG. 6 shows in section the piston with the control slide in working position II.

The mode of operation of the auxiliary control will be described as follows with particular reference to FIGS. 4 to 6.

In conventional use several auxiliary controls are usually coupled together in groups, either in parallel or in series as is illustrated in FIGS. 7 and 8, respectively, and described in connection with the latter. The mode of operation of the auxiliary control in the neutral position must be adjusted to the type of coupling which is used in such group coupling. On coupling several auxiliary controls in series, that is to say a discharge of an auxiliary coupling coupled to the feed of the subsequent one in the row, the auxiliary controls must give free passage for oil in the neutral position. This condition is illustrated in FIG. 4.

The pressure oil here passes from the feed opening 27 through the longitudinal cavity 29 in the piston 20 forward to the groove 38 in the control slide housing 31. With the operating pul lhandle 17 in the neutral position and with the illustrated form of the control slide 32, the groove 41 in the control slide forms a connection between the grooves 36 and 37 in the control slide housing 31, the groove 42 forms a connection between the grooves 37, 38 and 39 while the groove 43 forms a connection between the grooves 39 and 40. From the grooves 38 in the control slide housing 31 there will thus be a free passage between both chambers 23 and 24 through the groove 39 and the bore 33 and the groove 37 and the bore 34 respectively and to the discharge opening 28 via the grooves 36 and 40 in the control slide housing 31 to the longitudinal cavity 30. Pressure oil thus flows freely through the auxiliary control.

On coupling several auxiliary controls in parallel, that is to say with common feed conduits and common discharge conduits, the auxiliary controls must close off the flow of oil in the neutral position. This can be achieved by making the groove 42 in the control slide so much narower that in the neutral position it can only uncover the groove 38 in the control slide housing 31 so that the pressure oil blocks off the flanges on both sides of this groove and remains stationary.

In order to cause the piston 20 to be pressed upwards the operating pull handle 17 is moved upwards. This movement is effected via the shaft 57, the arm 58 and the link arm 59, and the control slide 32 is moved out of the control slide housing 31. This first portion of the movement constitutes the stroke of the control slide in this direction. This is limited by the abutment of the sleeve 46 against the lowest edge of the control slide housing 31. By this movement of the control slide 32, the groove 42 of the control slide is connected only to the grooves 38 and 39 in the control slide housing 31 so that pressure oil from the opening 27 is led to the bore 33 and further to the chamber 23. At the same time communication is to be maintained or formed, dependent upon the mode of operation in the neutral position, between the grooves 36 and 37 in the control slide housing via the grove 41 in the control slide, while communication between the grooves 39 and 40 in the control slide housing is broken, the groove 43 in the control slide only uncovering the groove 40. Pressure oil is thereby led to the chamber 23 and the bottom side of the piston 20, while communication is maintained or formed for the discharge of return oil from the chamber 24 and the oil pressure presses the piston upwards.

In order to cause the piston 20 to be pressed downwards, the operating pull handle 17 must be moved downwards in a corresponding manner, whereby the control slide 32 is moved downwards and inwards into the control slide housing 31. The first portion of this movement constitutes the stroke of the control slide 32 in this direction and it is limited by the flange 44 on the control slide abutting the plate 35 on the piston 20. By this movement the groove 42 of the control slide comes into communication with the grooves 37 and 38 in the control slide housing so that pressure oil from the opening 27 is led to the bore 34 and further to the chamber 24. At the same time communication is maintained or formed between grooves 39 and 40 of the control slide housing via the groove 43 of the control slide, while communication between grooves 36 and 37 of the control slide housing via the groove 41 of the control slide is broken, the groove 41 only uncovering the groove 36. Pressure oil is thereby fed to the chamber 24 and the upper side of the piston 20 while communication is formed or maintained between the chamber 23, the bore 33 and the outlet 28, and the piston is pressed downwards.

The movement of the piston 20 is directly proportional to the movement of the operating pull handle 17 and is delayed relative to this by a time interval which corresponds to a movement of the piston equal to the stroke of the control slide 32 in one or the other direction. When the operating pull handle 17 is moved to a position outside the neutral position and is maintained there against the force of the spring 53, the piston 20 is thus moved according to the short distance which the stroke makes so that the control slide 32 again comes into the neutral position relative to the control slide housing 31. Thus in this position there is no place for any power transfer from the piston 20.

The speed at which the piston 20 is moved out from the neutral position is, when viewed aside from the limitations in speed of the oil supply, dependent upon how rapidly the operating pull handle 17 is moved.

The reverse path of the control slide 32 to the neutral position will be described with reference to FIGS. 2 to 4. When the operating pull handle 17 is moved, for example upwards, the spring 53, which is mounted at a certain tension between the abutments 54 and 55 which bear against the step of the bolt 52 and the stop 56 respectively, is drawn further together due to the flange 47 pressing against the abutment 55. When the operating pull handle is released, the spring 53 displaces the control slide back to the abutments bearing against their respective stops and by this over into a position which corresponds to the movement of the operating pull handle 17 downwards, which is illustrated in FIG. 6. The pressure is then led to the upper side of the piston 20 as described above, thereby pressing it downwards to the neutral position. The same occurs but in reverse if the handle is released from working position II.

The mode of operation of the control system can now be described as follows:

When the operating pull handle is moved into one of the other direction from the neutral position, the oil pressure presses the piston 20 as described above in the same direction and to the same extent as the handle is moved. The piston 20 actuates the working means 16 of the auxiliary control which is connected to and moves the control means 15 of the operating valve 10 via the control piston 26, link arms 49, the arm 50 and the shaft 51. There will thus be proportionality between the movement of the operating pull handle 17 and the control means 15 of the operating valve under the conditions stated above.

Assuming that the stroke of the auxiliary control 14 is adjusted according to the area of movement of the control means 15, the control means can be displaced completely to the stop. If it is to be caused to assume a position which lies between the central position, which will coincide with the neutral position of the auxiliary control 14, and an outer position, this is achieved by moving the operating pull handle 17 outwards to the corresponding position and maintaining it there against the force of the spring 53.

The reverse movement of the control means 15 to the central position occurs on release of the operating pull handle 17. As described above the system is then forced back to the starting position, i.e. the neutral position.

It has already been mentioned that several auxiliary controls are usually coupled together in groups. In FIG. 7 three auxiliary controls 60, 61, 62 are illustrated which are coupled in series with a feed conduit 63 and a return conduit 64, the discharge of the auxiliary control 60 being connected to the subsequent feed of the auxiliary control 61 etc. The oil feed is effected from a separate auxiliary pump 65 while the associated operating valves 66, 67, 68 which control working means 69, 70, 71 respectively which can be hydraulic motors, are supplied from a main pump 72. The auxiliary controls must in this type of coupling, as already described, be of a kind which provides free oil passage in the neutral position.

In FIG. 8 there are shown three auxiliary controls, 73, 74, 75 which are coupled in parallel so that they have a common feed conduit 76 and a common return conduit 77. The oil feed occurs here from a main pump 78 which simultaneously supplies three operating valves 79, 80, 81 which respectively control working means 82, 83, 84. In individual cases the pressure on the working means is higher than on the pump, for example when a winch slackens with the load. In order to maintain constantly the highest possible pressure in the auxiliary arrangement conduits are therefore led from each of the working means, that is to say in practice from the exhaust side of the operating valve towards the working means, to the feed side of the associated auxiliary control. In this conduit there are inserted nonreverse valves 85, 86, 87 and a nonreverse valve 88 is inserted in the feed conduit 76. The auxiliary controls must with this type of coupling, as already described, be of a type which in the neutral position are closed to the flow of oil.

FIGS. 7 and 8 illustrate two preferred forms of joint coupling of auxiliary controls into groups and the method of operating these. However several practically effective combination possibilities are to be found within the scope of the invention. For example it is possible to operate a group of auxiliary controls coupled in parallel with a separate auxiliary pump even if this will require a relatively large auxiliary pump. Also it is possible to supply a group of auxiliary controls coupled in series with oil from the main system of the installation.

In addition to the properties which have already been mentioned, a hydraulic control system according to the invention also has the advantage of being able to be used even if the auxiliary control as such is out of operation.

It will then still be possible to operate the operating valve by means of the operating pull handle. The power will then be transferred from the operating pull handle 17 to the piston 20 by the abutment of the flange 44 against the plate 35 and the abutment of the sleeve 46 against the control slide housing 31. With auxiliary controls having the closed neutral position it must be ensured in such a case that they are short-circuited by the aid of suitable means.

What I claim is:

1. An arrangement in the control system for hydrostatic winches of the low pressure type, in which the winch installation comprises a pump which delivers a constant volume of driving medium per unit time, a motor having a substantially constant consumption of driving medium per revolution, an operating valve of the four-way type coupling said pump and motor and adapted to adjust the direction of drive of the motor and to vary its speed by leading a suitable quantity of driving medium outside the motor through a short-circuit path directly to a return conduit of the pump, an auxiliary slide displaceable from a zero position in which said slide together with a part cooperating with said auxiliary slide is hydraulically counterbalanced to a position in which said part cooperating with the auxiliary slide is exposed to hydraulic counterbalancing in the same direction as the displacement, and an operating pull handle for displacing said slide.

2. An arrangement in accordance with claim 1, wherein said auxiliary slide is an axially displaceable slide which is axially displaceable and coaxially received in an inner bore provided in said part cooperating with the auxiliary slide, which in turn is constituted as a piston axially displaceably received in a bore in a cylinder housing.

3. An arrangement in accordance with claim 2, wherein the supply and liberation of driving medium occurs through openings in the cylinder housing, all the flow of driving medium to and from said auxiliary slide being led through passages in the piston.

4. An arrangement in accordance with claim 3, wherein said piston is provided with a first and a second axially extending cavity diametrically opposed and placed on the periphery of the piston, which cavities communicates with a first and a second and third annular groove respectively, in an auxiliary slide housing built into the piston, said first cavity uncovering a feed opening and said second cavity uncovering a discharge opening in the cylinder housing, and wherein a bore inwards from each end of the piston communicates with a fourth and a fifth annular groove in the auxiliary slide housing respectively, the auxiliary slide being provided with three annular grooves on the periphery, the various grooves being axially so arranged as to establish connection alternately between one of the piston's sides and one of the openings for feed and discharge, dependent upon which side of a neutral position the auxiliary slide it is to be found.

5. An arrangement in accordance with claim 4, wherein said first and second cavities are elongated and uncover said feed opening and discharge opening during the whole of the movement of the piston.

6. An arrangement in accordance with claim 5, wherein said piston on the periphery is provided with two symmetrically arranged groups of cavities communicating with said first and second cavity respectively, the length and the width of the various cavities being substantially equal.

7. An arrangement in accordance with claim 6, wherein each group of cavities comprises two cavities and an angular spacing of 120° with respect to the first and second cavity respectively, on each side of said first and second cavity.

8. An arrangement in accordance with claim 7, wherein each cavity communicates through a radially extending bore with corresponding of said annular grooves in the auxiliary slide housing.

9. An arrangement according to claim 1, wherein the auxiliary controls for controlling several operating valves in an installation are coupled in series such that the discharge of each auxiliary control is coupled to the feed of the subsequent auxiliary ocntrol.

10. An arrangement in accordance with claim 1, wherein the auxiliary controls for controlling several operating valves in an installation are coupled together in at least one group having common feed conduits and common discharge conduits for driving medium.

11. An arrangement in accordance with claim 9, wherein said first annular groove which communicates with the feed opening, in the neutral position communicates with the exhaust opening via said annular grooves of the auxiliary slide and the second cavity.

12. An arrangement in accordance with claim 10, wherein said first groove which communicates with the feed opening in the neutral position is closed by said auxiliary slide.

13. An arrangement in accordance with claim 2, comprising a bolt secured in said cylinder housing at the extension of the axis of said auxiliary slide which projects into the cylinder housing and upon which the auxiliary slide is arranged coaxially so that it bears externally against the ends of a double-operating, tensioned pressure spring which is disposed on the bolt so as to be forced back to the neutral position.

14. An arrangement in accordance with claim 2, wherein there is arranged in rigid connection with the piston a control piston which is connected to a link connection, so that said control piston resists the radial forces which act on the connection.

15. An arrangement in accordance with claim 1, wherein said driving medium is fed from the main pump of the installation and from the pressure side of a working means, the driving medium being supplied from the position which at any time has the highest working pressure.

16. An arrangement in accordance with claim 1, wherein driving medium is fed from a separate auxiliary pump by means of a suitable cyclical path.

References Cited

UNITED STATES PATENTS

| | | | |
|---|---|---|---|
| 2,258,307 | 10/1941 | Vickers | 60—53(WBR)UX |
| 2,382,866 | 8/1945 | Edge et al. | 60—52(B)UX |
| 2,822,668 | 2/1958 | Huse | 60—531 |

EDGAR W. GEOGHEGAN, Primary Examiner

U.S. Cl. X.R.

91—462